(No Model.) 2 Sheets—Sheet 1.
E. CHAFFEY.
MECHANISM FOR TRANSMITTING POWER.
No. 434,916. Patented Aug. 26, 1890.
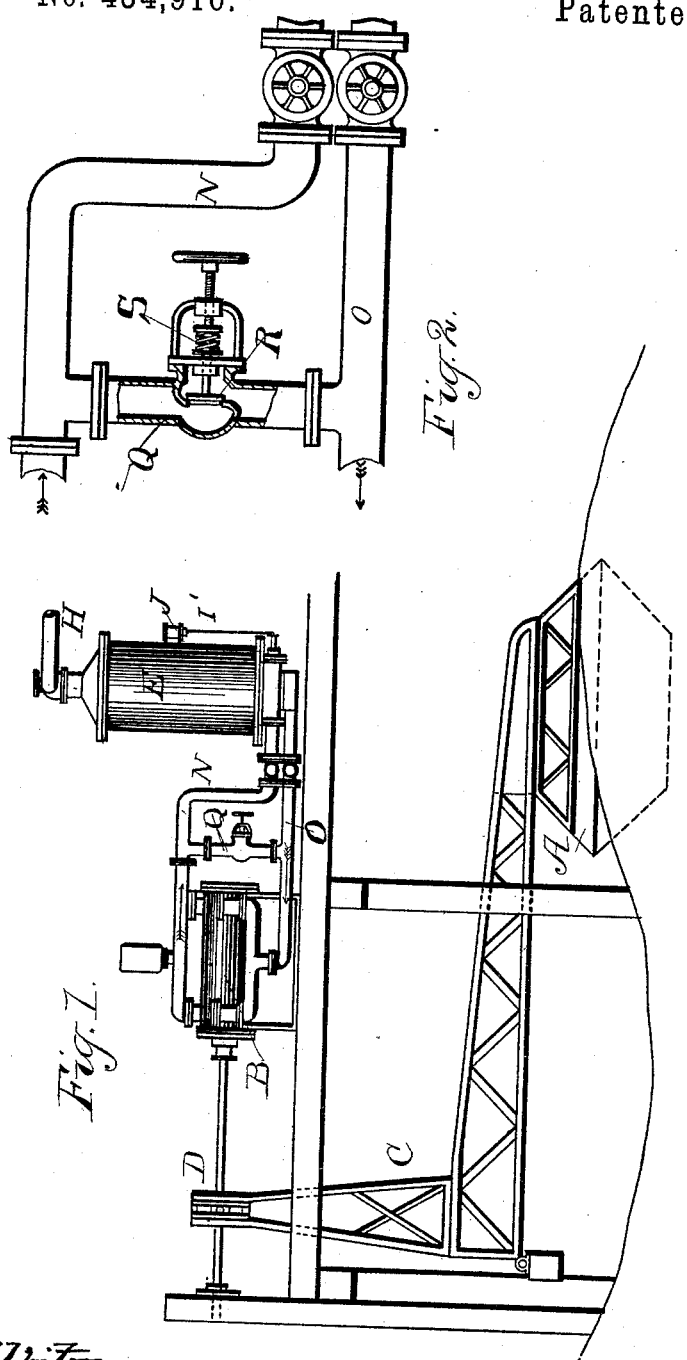
Witnesses.
B. M. Whitaker
M. C. Galer.
Inventor.
Elswood Chaffey
by
Hazard & Townsend
his Atty

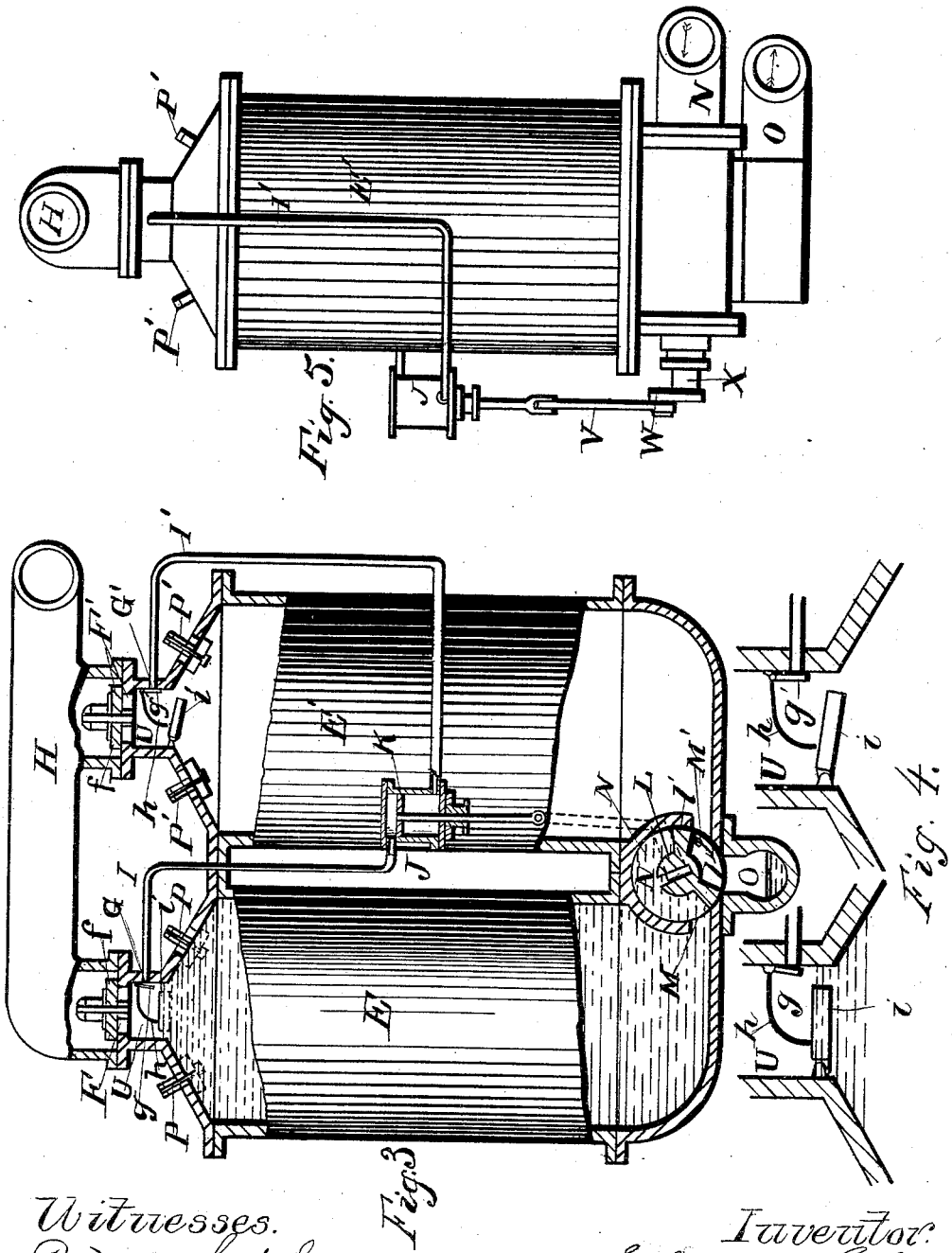

UNITED STATES PATENT OFFICE.

ELSWOOD CHAFFEY, OF SANTA MONICA, CALIFORNIA.

MECHANISM FOR TRANSMITTING POWER.

SPECIFICATION forming part of Letters Patent No. 434,916, dated August 26, 1890.

Application filed November 8, 1889. Serial No. 329,713. (No model.)

*To all whom it may concern:*

Be it known that I, ELSWOOD CHAFFEY, a subject of Great Britain, residing at Santa Monica, in the county of Los Angeles and State of California, have invented a new and useful Improvement in Mechanism for Transmitting Power, of which the following is a specification.

My invention relates more particularly to improvements upon an invention in wave-motors heretofore made by me, and for which I filed an application for patent in the United States Patent Office August 21, 1889, Serial No. 321,548. Said invention consists in transmitting the power of waves to the machinery to be operated through a liquid medium operating through an interposed hydraulic accumulator. In said application for Letters Patent I have suggested the use of air as a further medium for the transmission of power from the waves. The use of air in this capacity is not novel; but the purpose of this invention is to provide simple and efficient means for the transmission of power from waves and for the compression of air to operate machinery. In the compression of air by pistons operating in compressor-chambers heat is liberated. I propose to carry off this heat by using water within the chambers to serve as the compressing medium for the compression of the air, thereby carrying off the heat in the water used.

My invention is adapted for the transmission of power from the waves and tide, and includes mechanism for conveying the power from such a source; but a portion of the machinery is designed for the transmission of power however derived, which is claimed by me separately in an application for patent which I filed in the United States Patent Office February 3, 1890, Serial No. 339,101, said application being made upon demand of examiner for division of this application.

The accompanying drawings illustrate my invention.

Figure 1 is a side elevation of my invention, including means for receiving and transmitting power from the waves. Fig. 2 illustrates the relief-valve. Fig. 3 is a view of the compressor-chambers, partially in section, to disclose the interior mechanism. Fig. 4 is a detail of the shifting-valves in the top of such chambers. Fig. 5 is a side elevation of the pair of compressor-chambers on the side opposite that shown in Fig. 1.

A is the wave-actuated float. B is a pump operatively connected therewith by intermediate connections C D.

E E' are chambers provided at their tops with valved air-receiving and air-discharging ports. Ports or openings F F' G G' are for the escape of air. Ports P P' are for the ingress of air.

H is the compressed-air pipe or conduit to conduct the compressed air to the point where it is to be utilized. Valved openings F F' communicate with pipe H, and the valves $f f$ are arranged to close by gravity and by the pressure of the air in pipe H. The valved openings G G' are respectively closed by valves $g g'$, hinged within chambers E E' to close the openings G G' by gravity and by the pressure of air in the chamber. Each of the valves $g g'$ is provided with a rearwardly and downwardly projecting arm $h$, which extends into the path of a pivoted float $i$, arranged to be elevated by the rising liquid when the liquid rises to the top of the chamber. Pipes I I' communicate, respectively, with the chambers E E' through valved openings G G' and with valve-shifting cylinder J, which is adapted to receive the head of piston K, which reciprocates therein between the ports of the pipes I and I', which enter the cylinder at opposite ends. The piston-head is connected by intermediate means with a rotary shifting-valve L, which is arranged to control the flow of liquid into and from the chambers—that is to say, said valve is arranged to alternately open and close the lower receiving and discharge ports M M', which are arranged at the bottom of chambers E E', respectively, and adapted for communication with feed or supply pipe N and exhaust-pipe O. Feed-pipe N communicates with the discharge-ports of the pump or with some other source of supply, and exhaust-pipe O communicates with the receiving-ports of the pump or with a suitable discharge outlet or drain. Valve L is provided with two leaves $l\ l'$, which play back and forth across ports M and M', respectively, as the valve is shifted. The leaves $l\ l'$ are so arranged in relation to each other and to the ports that when leaf $l$ is below its port M (thus leaving a passage into E from pipe N) leaf $l'$ will be above its port M', thus closing the passage from N to E' and opening the passage from E' to O, and vice versa when the valve is shifted.

In the drawings pipe O communicates with the receiving-ports of the pump, so that the liquid discharged from the chambers E E' will be conducted to the pump to be reused constantly. If desired, the pump may be connected with a source of supply and the exhaust liquid be allowed to pass away from the machine. It is preferable, however, to reuse the liquid constantly, as it is thus possible to employ a pure liquid and avoid deposits within the pump and compressor-chambers.

By means of the pump and the mechanism detailed in Figs. 3 and 4 I produce two automatically-reciprocating columns of liquid operating vertically to fill and exhaust the chambers E E', which are respectively provided at the top with inlet-valves P P' to admit air to supply the vacuum when the liquid exhausts from the chamber.

Q is a relief-pipe connecting the pipes N and O at a point between the pump and the compressor-chambers. The pipe Q is provided with relief-valve R, which is held in place by spring S, which is adjustable as to tension and is arranged to resist the normal excess of pressure of the liquid in pipe N over that in O, so as to hold the valve in position to close the pipe Q against the passage of liquid from N to O, except in case of stoppage of the liquid in the compressors. In case such stoppage should occur the wave-motor might strain the pump or other portions of machinery. By means of the pipe Q and the relief-valve a circulation through the pump and pipes N, Q, and O is maintained and the strain relieved.

The operation is as follows: Liquid is placed within the machine in sufficient volume to fill the pipes N, O, and Q, the cylinder of the pump, and one of the compressor-chambers. The wave-operated float reciprocates the intermediate mechanism C D to operate the pump to force the liquid through pipe N into the empty compressor-chamber, which is filled thereby, while the liquid is withdrawn from the other chamber to supply the pump. While the liquid exhausts from the chamber, air is admitted through valves P P' to supply the vacuum. In the meantime the liquid forced into the other chamber, which was originally empty and which for convenience of illustration we will now assume to be E, compresses the air in E until its tension is sufficient to raise valve $f$ to escape into pipe H. The upper end of the chamber is preferably contracted, so that the residual air is concentrated in a small space or upper chamber U, at the mouth of which the float $i$ is hinged. During the compression of the air valve $g$ has been closed by gravity and the pressure of air in the chamber. The surface of the rising liquid now engages with float $i$ and raises it to engage and raise the end of rod $h$, which operates to open valve $g$ and admit to the upper end of valve-shifting cylinder J the residue of the compressed air which has not escaped into H from U. At this instant there is no pressure within E', from which the liquid is exhausting, and valve $g'$ is free to be driven back to allow the escape of air from pipe I', leading from the lower end of cylinder J, thus allowing piston K to move downward under the pressure of the air from E. The piston K is operatively connected with valve L by means of pitman V and crank W, and the partial rotation of valve-shaft X causes the valve to close the port from N to E, open that from E to O, close that from E' to O, and open that from N to E'. The curved arrow in Fig. 3 shows the direction in which the valve L moves in this case. When the valve is thus shifted, the liquid begins to exhaust from E into O and to enter E' from N. The subsidence of the liquid allows float $i$ to drop, thus allowing valve $g$ to fall into its closed position. The operation following is then the same as that described.

By means of this device I utilize the residual compressed air at the top of the chambers, which otherwise would expand to fill the vacuum formed by the receding liquid.

Although I claim the mechanism detailed in Figs. 3, 4, and 5 as new, I do not limit myself to their use, as other means for shifting the valves readily suggest themselves to artisans. I have made no attempt to illustrate such other forms. I deem this the most practicable.

It is essential to the operation of the compressors that there be a constant supply of liquid under pressure in the pipe N and a constant and free discharge through pipe O. The suction of the pump in the device shown will make the discharge from the chambers through pipe O more positive than it would be if the pipe O terminated outside of the machine. Where the pump is used it will probably be desirable to pass pipe O through some cooling device arranged intermediate between the chambers and the pump.

Now, having described my invention, what I claim as new, and desire to secure by Letters Patent, is—

1. The combination of a wave-operated float, a pump operatively connected therewith by intermediate connections, such connections, two air-compressor chambers provided at their tops with valved air receiving and discharging ports and provided with lower receiving and discharge ports, a supply-pipe connecting the discharge-ports of the pump with such lower receiving-ports, an exhaust-pipe connecting the lower discharge-ports with the receiving-ports of the pump, means for alternately and reciprocatingly opening and closing the lower receiving and discharging ports, and a volume of liquid sufficient to fill such pipes, the pump, and one of the compressor-chambers.

2. The combination of a wave-operated float, a pump operatively connected therewith by intermediate connections, such connections, two air-compressor chambers provided at their tops with valved air receiving and discharging ports and provided with lower receiving and discharge ports, a supply-pipe connecting the discharge-ports of the pump with such lower receiving-ports, an exhaust-pipe connecting the lower discharge-ports with the receiving-ports of the pump, a relief-pipe located between the pump and the compressor-chambers, said pipe being arranged to connect the supply and exhaust pipes and being provided with a relief-valve arranged to resist the normal excess of pressure of the liquid in the supply-pipe over that in the exhaust-pipe, means for alternately and reciprocatingly opening and closing the lower receiving and discharging ports, and a volume of liquid sufficient to fill such pipes, the pump, and one of the compressor-chambers.

ELSWOOD CHAFFEY.

Witnesses:
JAMES R. TOWNSEND,
ELIZA C. CHAFFEY.